US007102486B2

(12) United States Patent
Yamagishi

(10) Patent No.: US 7,102,486 B2
(45) Date of Patent: Sep. 5, 2006

(54) LOCKING APPARATUS

(75) Inventor: Junichi Yamagishi, c/o Unirec Co., Ltd., 6-3, 2-chome, Kaminarimon, Taito-ku, Tokyo (JP) 111-0034

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 266 days.

(21) Appl. No.: 10/603,316

(22) Filed: Jun. 25, 2003

(65) Prior Publication Data

US 2004/0012482 A1 Jan. 22, 2004

(30) Foreign Application Priority Data

Jun. 27, 2002 (JP) ........................... P2002-187128

(51) Int. Cl.
*G05B 19/00* (2006.01)

(52) U.S. Cl. ..................... 340/5.53; 340/5.83; 340/5.3; 340/5.33; 340/540; 340/541; 283/68; 283/70; 70/224; 70/278.1

(58) Field of Classification Search ............... 340/5.53, 340/5.83, 5.3, 5.33, 540, 541; 283/68, 70; 70/224, 278.1
See application file for complete search history.

(56) References Cited

U.S. PATENT DOCUMENTS 5,054,056 A * 10/1991 Blythe ........................ 379/145
5,920,640 A * 7/1999 Salatino et al. ............. 382/124
6,100,811 A * 8/2000 Hsu et al. .................. 340/5.83

FOREIGN PATENT DOCUMENTS

| | | |
|---|---|---|
| JP | 2002-070382 | 3/2002 |
| JP | 2002 155650 | 5/2002 |
| JP | 02002155650 A * | 5/2002 |

* cited by examiner

*Primary Examiner*—Wendy R. Garber
*Assistant Examiner*—Vernal Brown
(74) *Attorney, Agent, or Firm*—Jordan and Hamburg LLP

(57) ABSTRACT

A locking apparatus has improved operability and is manufacturable at low cost. The locking apparatus has a fingerprint reader (23), a fingerprint verifier (11), and a power supply circuit. The fingerprint reader reads a fingerprint. The fingerprint verifier verifies the read fingerprint based on registered fingerprint data, and according to a result of the verification, authenticates a person who entered the fingerprint. If the person is authenticated, the locking apparatus unlocks a door locked with the locking apparatus. The locking apparatus comprises a chamber (19) configured to contain the fingerprint reader, a lid (25) configured to open and close the opening of the chamber, and a switch (41) provided for the power supply circuit and configured to interlock with the lid so as to turn on and off the power supply circuit in response to the opening and closing of the lid.

4 Claims, 6 Drawing Sheets

LOCKING APPARATUS

BACKGROUND OF THE INVENTION

1. Field of the Invention

The present invention relates to a locking apparatus capable of verifying a fingerprint and unlocking a door locked with the locking apparatus.

2. Description of Related Art

An example of a locking apparatus is disclosed in Japanese Unexamined Patent Application No. 2002-70382 briefly shown in FIGS. 8 and 9. FIG. 8 is a front view partly showing a door 101 seen from the outside thereof and FIG. 9 is an enlarged perspective view showing an operation unit 103 installed on the door 101.

The operation unit 103 of the related art has a housing 105 attached to the door 101. The housing 105 incorporates a fingerprint reader 107. The reader 107 is in a chamber 109 defined in the housing 105. The chamber 109 has an opening 111 to be opened and closed with a lid 113. Usually, the opening 111 is closed with the lid 113.

The locking apparatus receives necessary power from a power source such as a battery or a DC source. The power source has a power switch that is turned on when the fingerprint reader 107 is pushed with a finger.

To unlock the door 101, a person opens the lid 113, puts a finger on the fingerprint reader 107, and presses the reader 107 with the finger to turn on the power switch. The reader 107 reads a fingerprint from the finger. The read fingerprint is sent to a fingerprint verifier that verifies the read fingerprint based on registered fingerprint data. If the fingerprint verifier authenticates the person with the fingerprint, the door 101 is unlocked.

This apparatus of the related art involves troublesome handling. When a person wants to open the door 101, the person must open the lid 113, insert a finger, and press the fingerprint reader 107 to turn on the power switch. In this way, the related art provides no ease of use.

The fingerprint reader 107 must every time be pressed with a finger to turn on the power switch, and therefore, the reader 107 has a risk of breakage and is unreliable in durability.

To turn off the power switch, the related art must employ, for example, a timer. This increases the cost of the apparatus.

SUMMARY OF THE INVENTION

An object of the present invention is to provide a locking apparatus that is easy to handle, durable, and inexpensive.

A first aspect of the present invention provides a locking apparatus having a fingerprint reader, a fingerprint verifier, and a power supply circuit. The fingerprint reader reads a fingerprint. The fingerprint verifier verifies the read fingerprint based on registered fingerprint data, and according to a result of the verification, authenticates a person who entered the fingerprint. If the person is authenticated, the locking apparatus unlocks a door locked with the locking apparatus. The apparatus comprises a chamber having an opening and configured to contain the fingerprint reader, a lid configured to open and close the opening of the chamber, and a switch provided for the power supply circuit and configured to interlock with the lid so as to turn on and off the power supply circuit in response to the opening and closing of the lid.

For the locking apparatus of the first aspect, a second aspect of the present invention forms the lid from conductive material and grounds the same.

For the locking apparatus of any one of the first and second aspects, a third aspect of the present invention forms the chamber in a shape to receive a finger through the opening of the chamber, orients the fingerprint reader in the chamber to face a finger inserting direction, supports the lid so that the lid may open when pushed into the chamber, and employs a pusher configured to push the lid toward a position where the lid closes the opening of the chamber.

According to the first aspect, the locking apparatus has the fingerprint reader and fingerprint verifier. The fingerprint reader reads a fingerprint. The fingerprint verifier verifies the read fingerprint based on registered fingerprint data, and according to a result of the verification, authenticates a person who entered the fingerprint. If the person is authenticated, the locking apparatus unlocks the door locked with the locking apparatus.

The fingerprint reader is contained in the chamber, which is opened and closed with the lid. The lid is interlocked with the switch of the power supply circuit, so that the power supply circuit is turned on and off in response to the opening and closing of the lid. Namely, no switching operation is asked for when a person unlocks the door, thereby improving the operability of the apparatus.

The power supply circuit is turned on and off by opening and closing the lid without pressing the fingerprint reader with a finger. This improves the durability of the fingerprint reader.

The power supply circuit can be turned off without the use of, for example, a timer. This helps reduce the cost of the locking apparatus.

In addition to the effects of the first aspect, the second aspect forms the lid from conductive material and grounds the same. When a person opens the lid with a finger to make the fingerprint reader read a fingerprint, the static electricity of the person dissipates through the lid, thereby protecting the fingerprint reader from the static electricity.

In addition to the effects of the first and second aspects, the third aspect forms the chamber in a shape to receive a finger through the opening, orients the fingerprint reader in the chamber toward a finger inserting direction, and supports the lid so that the lid may open when pushed into the chamber. To make the fingerprint reader read a fingerprint, a person pushes the lid with a finger and inserts the finger into the chamber. Then, the fingerprint reader reads the fingerprint. This improves the operability of the apparatus.

The third aspect employs the pusher to push the lid toward the position where the lid closes the opening of the chamber. When the person removes the finger from the chamber, the lid automatically returns to the position to close the opening of the chamber and turn off the power supply circuit. This surely reduces the power consumption of the locking apparatus and elongates the service life of a battery when the power supply circuit is powered by the battery.

DETAILED DESCRIPTION OF EMBODIMENTS

Figure 1:
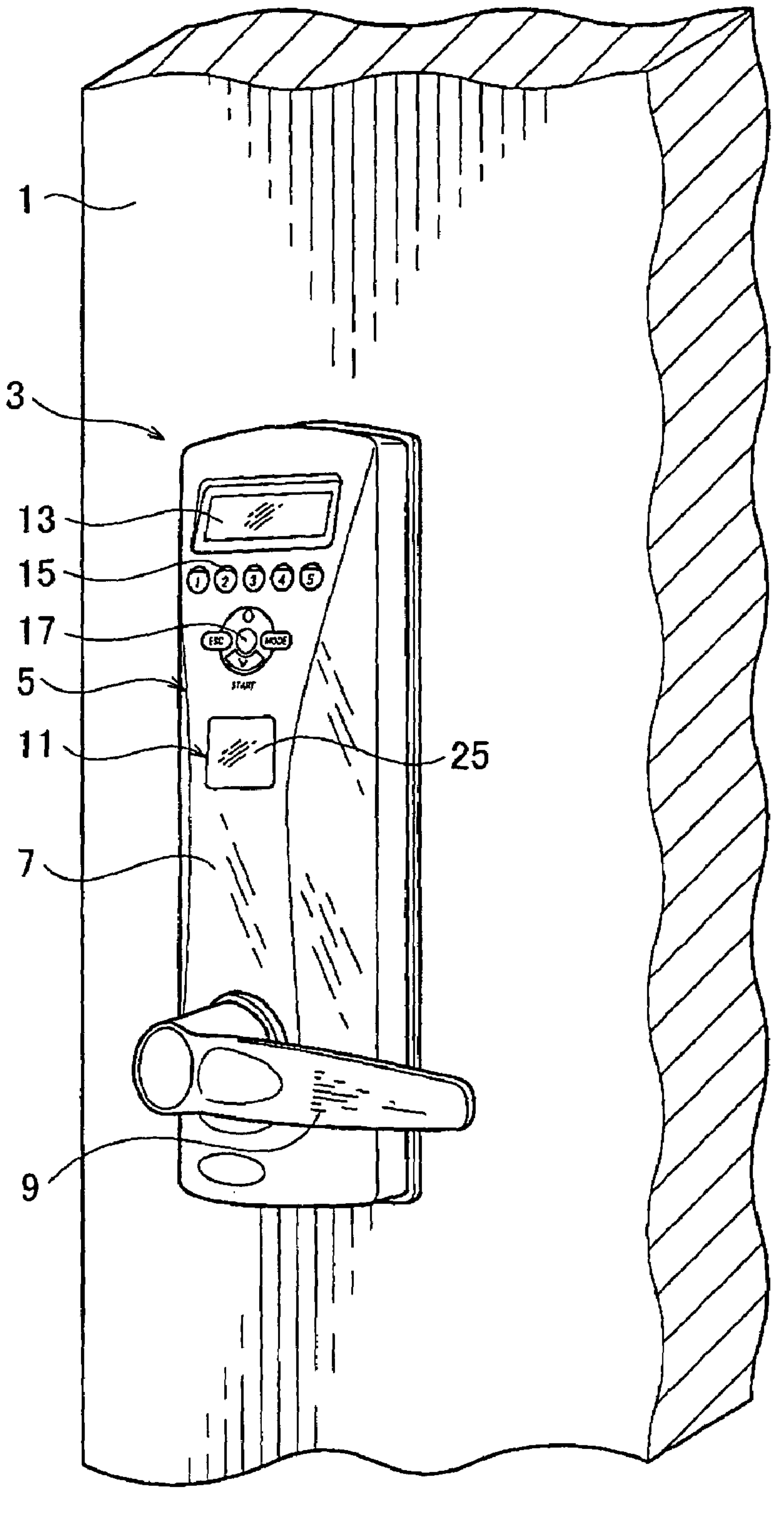
FIG. 1 is an enlarged perspective view partly showing a door with a locking apparatus according to an embodiment of the present invention.

FIG. 1 is a perspective view partly showing a door 1 with a locking apparatus 3 according to an embodiment of the present invention. The locking apparatus 3 has an exterior unit 5, a fingerprint reader 23, and a fingerprint verifier 11. The fingerprint reader 23 reads a fingerprint of a person, the fingerprint verifier 11 verifies the read fingerprint based on registered fingerprint data, and if the person is authenticated through the fingerprint verification, the locking apparatus 3 unlocks the door 1 locked with the locking apparatus 3.

The exterior unit 5 has a housing 7 fixed to the door 1 and a lever 9 supported by the housing 7. The lever 9 is used to open the door 1. The housing 7 houses the fingerprint verifier 11, an LCD panel 13, registration buttons 15, and set buttons 17. The LCD panel 13 is used to display various functions. The registration buttons 15 are used to enter, for example, an identification number. The set buttons 17 are used to set the locking apparatus 3 in various ways.

Figure 2A:
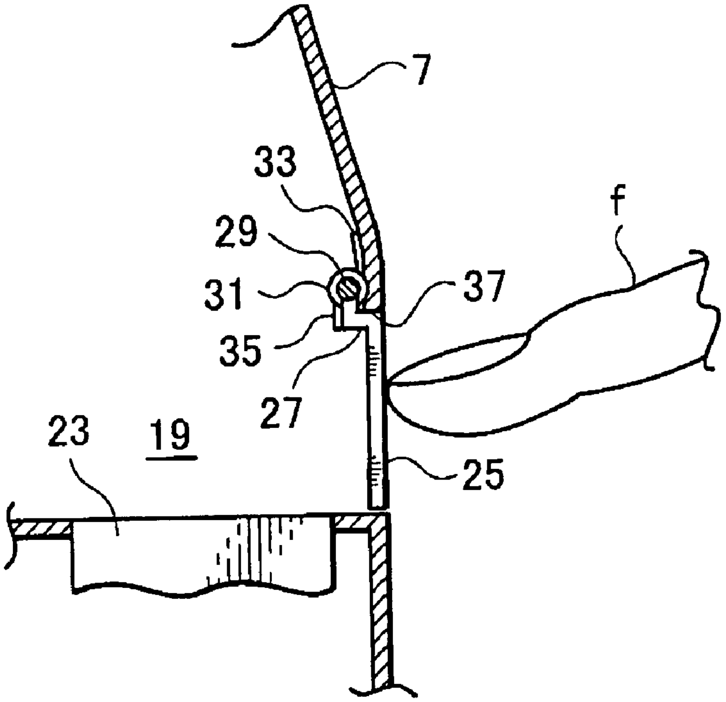
FIGS. 2A and 2B are enlarged sectional views partly showing the locking apparatus of FIG. 1 before and after inserting a finger into the apparatus.
Figure 2B:
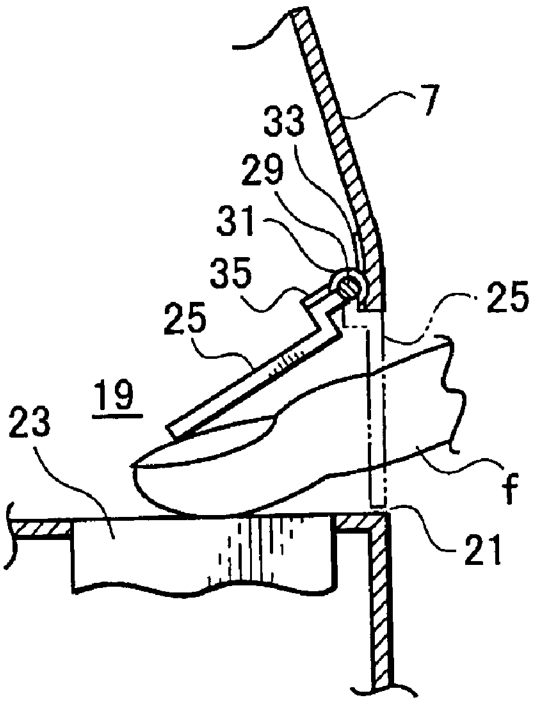

FIGS. 2A and 2B are enlarged sectional views partly showing the locking apparatus 3 before and after inserting a finger into the apparatus. The housing 7 has a chamber 19 having an opening 21 formed through the housing 7. At the bottom of the chamber 19, the fingerprint reader 23 is oriented to cross a direction (left-right direction in FIGS. 2A and 2B) in which a finger f is inserted and removed. Namely, the fingerprint reader 23 is positioned to face a finger f when the finger f is inserted into the chamber 19.

The opening 21 of the chamber 19 is provided with a lid 25 to open and close the opening 21. In a front view, the opening 21 and lid 25 are quadrate. At a closed position of the lid 25, the lid 25 is just fit in the opening 21.

The lid 25 has a top 27 that is formed in, for example, a hook shape provided with a shaft 29. The lid 25 is supported by the housing 7 through the shaft 29 and is turnable around the shaft 29. Around the shaft 29, a torque spring 31 is wound. The torque spring 31 has an arm 33 attached to the housing 7 and an arm 35 attached to the lid 25. The torque spring 31 serves as a pusher to push the lid 25 toward the position closing the opening 21. The pusher is not limited to the torque spring 31. It may be any other means.

When the lid 25 is at the closed position, the top 27 of the lid 25 is stopped by a top edge 37 of the opening 21.

The lid 25 is made of conductive material, which may be metal, plastic material mixed with carbon fiber, or conductive plastic material.

The lid 25 is interlocked with a switch 41 of a power supply circuit of the locking apparatus 3, so that the power supply circuit may be turned on and off in response to the opening and closing of the lid 25. The lid 25 is grounded.

Figure 3:
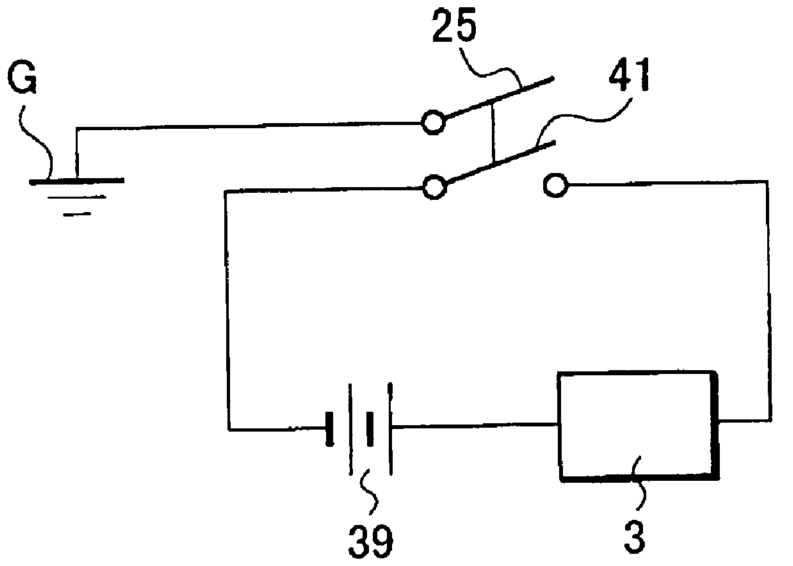
FIG. 3 is a circuit diagram showing a power supply circuit for the apparatus of FIG. 1.

FIG. 3 is a circuit diagram showing the power supply circuit of the locking apparatus 3. The circuit includes a power source, which may be a battery 39. The battery 39 needs only simple wiring, and therefore, can easily be attached to an existing door. The power source may be a DC source instead of the battery.

The power supply circuit includes the switch 41 interlocked with the lid 25 to turn on and off the circuit. The lid 25 is grounded (G in FIG. 3).

Usually, the lid 25 is at the closed position to close the opening 21 because the lid 25 is always pushed by the torque spring 31 toward the closed position. With the lid 25 being at the closed position, the switch 41 is open to supply no power from the battery 39 to the locking apparatus 3. As a result, the locking apparatus 3 is locked, and the door 1 cannot be opened with the lever 9.

When a person whose fingerprint is registered in advance in the fingerprint verifier 11 wants to open the door 1, the person puts a finger f on the lid 25 as shown in FIG. 2A. At this moment, the conductive lid 25 immediately grounds the static electricity of the person as shown in FIG. 3.

The lid 25 is always pushed by the torque spring 31 toward the closed position of the opening 21, and therefore, the lid 25 is surely pressed to the finger f when the person pushes the lid 25 with the finger f, to surely ground the static electricity of the person.

Figure 4:
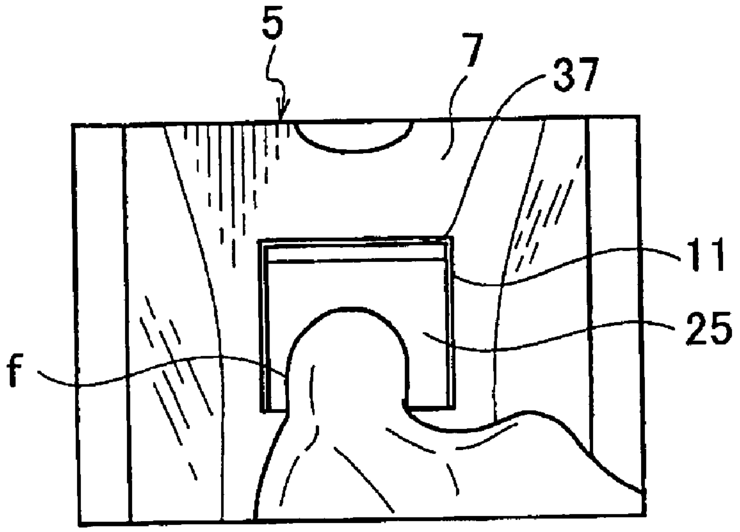
FIG. 4 is a front view partly showing the apparatus of FIG. 1 with a finger inserted into the apparatus.

The person inserts the finger f into the chamber 19 as shown in FIG. 4, and the lid 25 turns around the shaft 29 as shown in FIG. 2B against the force of the torque spring 31. When the lid 25 is turned around the shaft 29, the switch 41 of FIG. 3 interlocked with the lid 25 closes to supply power from the battery 39 to the locking apparatus 3 including the fingerprint reader 23 and fingerprint verifier 11.

In the chamber 19, the finger f faces the fingerprint reader 23. When the finger f is set on the fingerprint reader 23, the reader 23 reads a fingerprint from the finger f. At this time, the static electricity of the finger f has already been removed, and therefore, the reader 23 will not be damaged by static electricity. The read fingerprint is verified based on the registered fingerprint data in the fingerprint verifier 11. If the verification authenticates the person, the locking apparatus 3 unlocks the door 1.

Thereafter, the person retracts the finger f from the chamber 19. Then, the lid 25 automatically returns to the closed position of the opening 21 as shown in FIG. 2A due to the force of the torque spring 31. At the same time, the switch 41 interlocked with the lid 25 automatically disconnects the power supply circuit. Namely, the power supply circuit will never be left ON. This structure of the embodiment is simple and inexpensive to save power and extend the service life of the battery 39.

Figure 5:
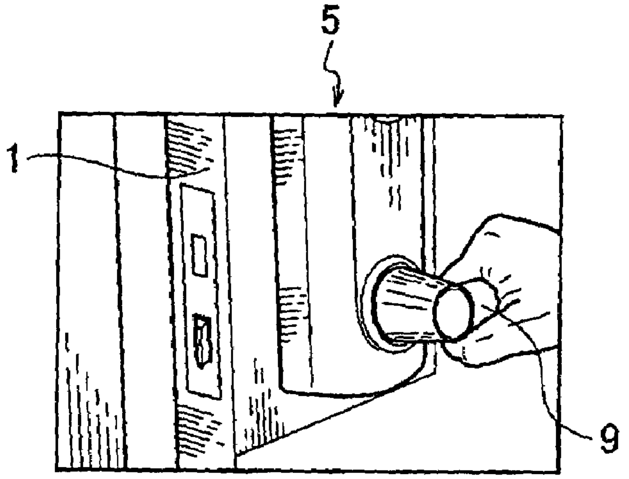
FIG. 5 is a perspective view partly showing the door of FIG. 1 being opened.

Once the door 1 is unlocked by the locking apparatus 3, the person can use the lever 9 to open the door 1 as shown in FIG. 5.

According to the embodiment, a natural operation of inserting the finger f into the chamber 19 is sufficient to dissipate the static electricity of the person, turn on the power supply circuit, and conduct fingerprint verification, thereby greatly improving the operability of the locking apparatus 3. Namely, to make the fingerprint reader 23 read a fingerprint, a person simply pushes the lid 25 with a finger and inserts the finger into the chamber 19. Then, the reader 23 reads the fingerprint of the finger. This provides ease-to-use for a person who uses the locking apparatus 3.

The power supply circuit of the locking apparatus 3 can automatically be turned on and off by opening and closing the lid 25 without pressing the fingerprint reader 23. This prevents the reader 23 from being damaged and extends the durability of the reader 23.

No additional device such as a timer is needed to turn off the power supply circuit of the locking apparatus 3. This helps reduce the manufacturing cost of the apparatus 3.

The torque spring 31 pushes the lid 25 toward the closed position of the opening 21. As a result, when a finger is pulled back from the chamber 19, the lid 25 automatically returns to the closed position and automatically turns off the power supply circuit through the switch 41 interlocked with the lid 25. This surely reduces the power consumption of the locking apparatus 3 and elongates the service life of a battery if the battery is used as a power source for the power supply circuit.

Figure 6:
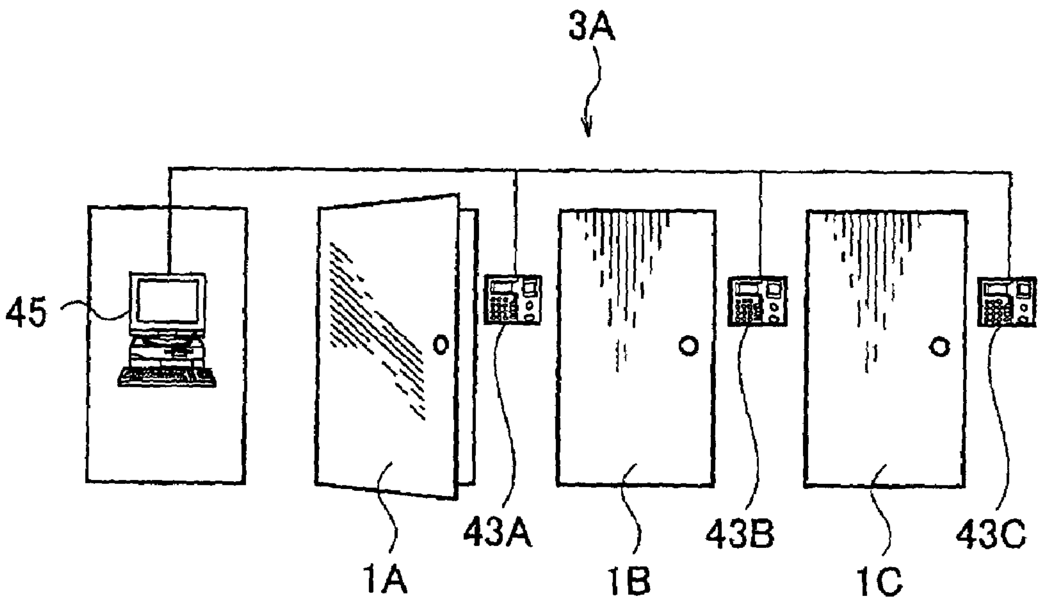
FIG. 6 is a schematic view showing a locking apparatus of a network configuration according to an embodiment of the present invention.
Figure 7:
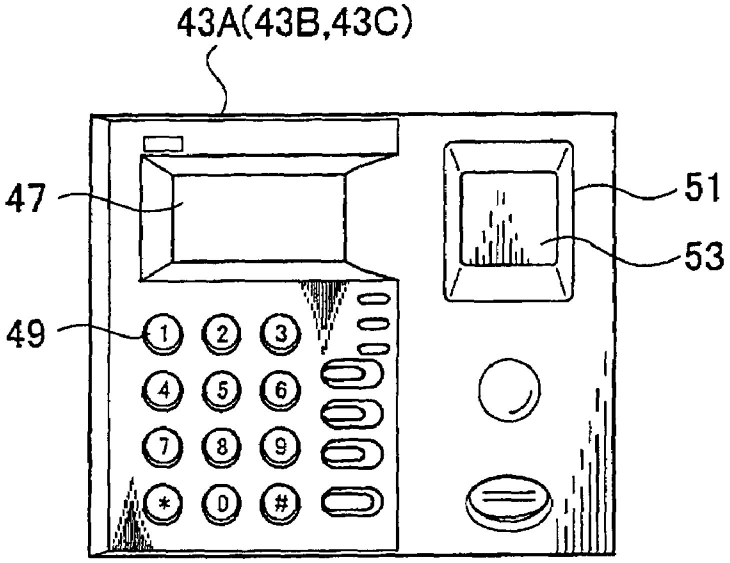
FIG. 7 is a front view showing an operation unit of the apparatus of FIG. 6.
Figure 8:
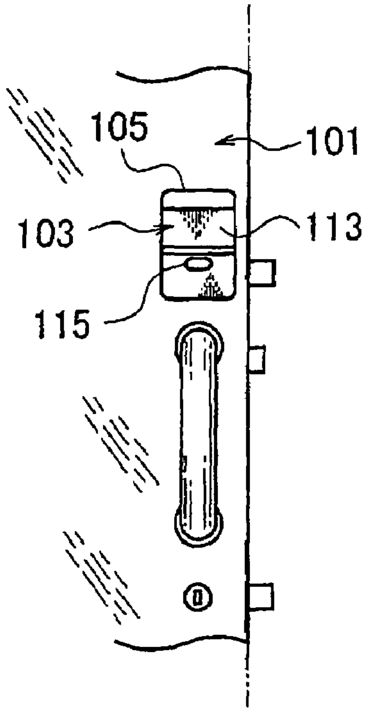
Fig.8 RELATED ART
FIG. 8 is a front view partly showing a door with a locking apparatus according to a related art.
Figure 9:
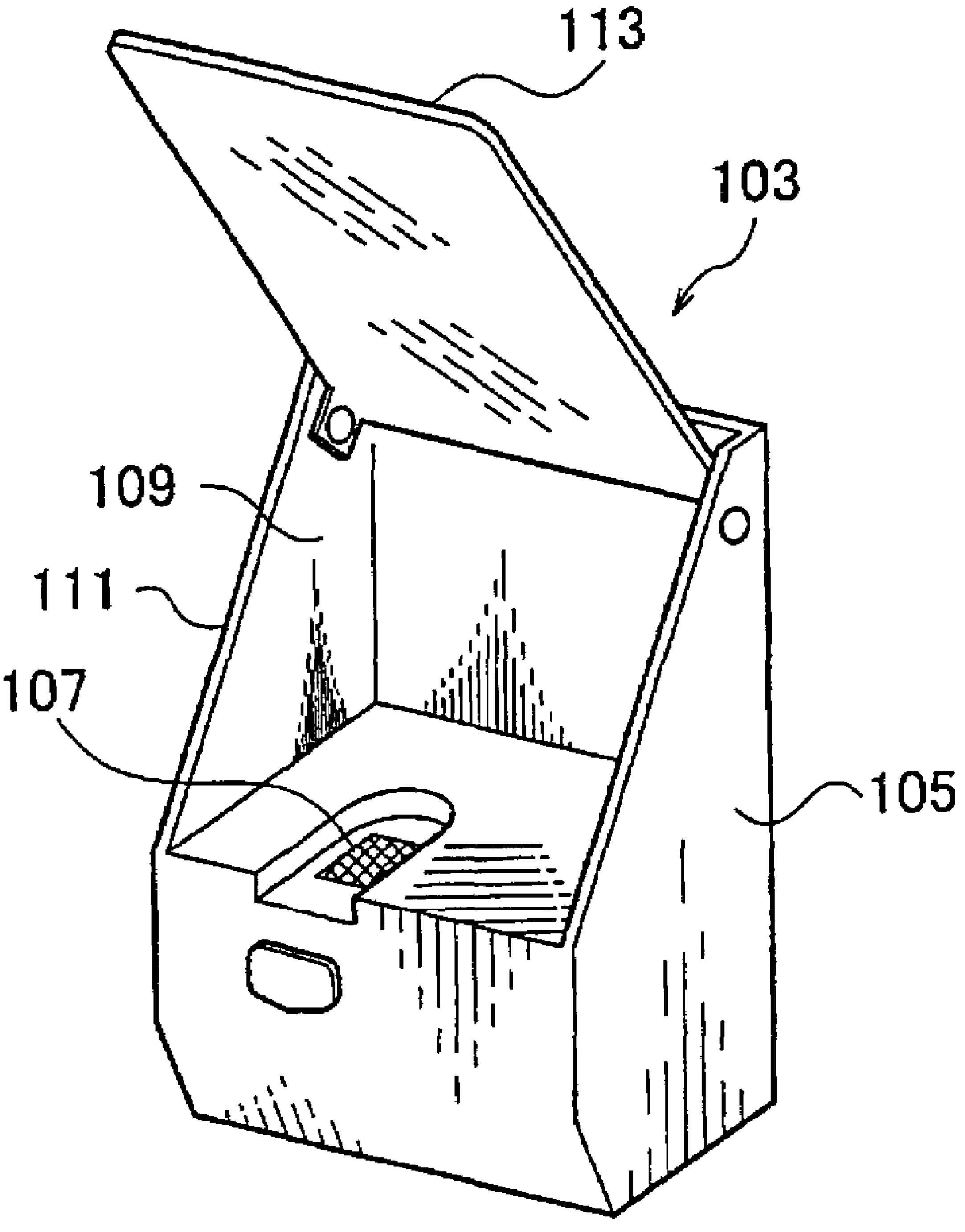
Fig.9 RELATED ART
FIG. 9 is a perspective view showing an operation unit of the apparatus of FIG. 8.

FIG. 6 is a schematic view showing a locking apparatus of a network configuration according to an embodiment of the present invention, and FIG. 7 is a front view showing an operation unit of the apparatus of FIG. 6.

In FIG. 6, doors 1A, 1B, and 1C are provided with operation units 43A, 43B, and 43C, respectively. The operation units 43A to 43C are connected to a host computer 45 that controls the operation units 43A to 43C.

The operation units 43A to 43C have an identical structure, and FIG. 7 shows the operation unit 43A as a representative of them. The operation unit 43A has an LCD panel 47, registration buttons 49, a fingerprint verifier 51 provided with a lid 53, and the like. The fingerprint verifier 51 and lid 53 are configured like the fingerprint verifier 11 and lid 25 of FIGS. 1 to 5.

The network-type locking apparatus of FIGS. 6 and 7 provides the same effects as those provided by the locking apparatus of FIGS. 1 to 5.

The torque spring 31 shown in FIGS. 2A and 2B may be omitted, so that the lid 25 may automatically return to the closed position by its own weight. In this case, the center of gravity of the lid 25 may be biased to a lower part thereof, to surely close the opening 21.

The lid 25 may be made of material other than conductive material. In the embodiment, the lid 25 is supported so as to be pushed into the chamber 19. Instead, the lid 25 can be supported so as to be pulled outwardly from the chamber 19 when opening the opening 21.

What is claimed is:

1. A locking apparatus comprising:

a fingerprint reader, a fingerprint verifier, and a power supply circuit, the fingerprint reader being configured to read a fingerprint, the fingerprint verifier being configured to verity the read fingerprint based on registered fingerprint data, and according to a result of the verification, authenticate a person who entered the fingerprint;

a locking mechanism configured to unlock, if the person is authenticated, a door locked with the locking apparatus;

a chamber having an opening, opposing sides at the opening and a planar bottom surface extending from the sides and across a bottom edge of the opening with a surface of the fingerprint reader disposed in and level with the planar bottom surface, the chamber being configured aligned about the fingerprint reader to receive a finger through the opening in an insertion orientation guided by the opening and the chamber to alien the finger with the fingerprint reader;

a lid configured to open and close the opening of the chamber, the lid being rotatably supported to rotate inward with respect to said chamber to open the opening of the chamber when urged by insertion of the finger and to allow access to the fingerprint reader by the finger to input the fingerprint; and a switch provided for the power supply circuit and configured to interlock with the lid so as to turn on and off the power supply circuit in response to the opening and closing of the lid.

2. The locking apparatus of claim 1, wherein the lid is made of conductive material and is grounded.

3. The locking apparatus of claim 1, further comprising a biasing device biasing the lid toward a position where the lid closes the opening of the chamber.

4. The locking apparatus of claim 2, further comprising a biasing device biasing the lid toward a position where the lid closes the opening of the chamber.

* * * * *